(12) United States Patent
Mazar (10) Patent No.: US 11,521,433 B2
(45) Date of Patent: Dec. 6, 2022

(54) COMPUTING SYSTEM WITH VEHICLE MAINTENANCE MECHANISM AND METHOD OF OPERATION THEREOF

(71) Applicant: MOJ.IO, Inc., Vancouver (CA)

(72) Inventor: Seyed Massoud Mazar, San Carlos, CA (US)

(73) Assignee: MOJ.IO, Inc., Vancouver (CA)

( * ) Notice: Subject to any disclaimer, the term of this patent is extended or adjusted under 35 U.S.C. 154(b) by 313 days.

(21) Appl. No.: 16/789,897

(22) Filed: Feb. 13, 2020

(65) Prior Publication Data

US 2021/0256778 A1  Aug. 19, 2021

(51) Int. Cl.
*G07C 5/00* (2006.01)
*G06F 16/248* (2019.01)
*G06F 16/21* (2019.01)
*G07C 5/08* (2006.01)

(52) U.S. Cl.
CPC ........... *G07C 5/008* (2013.01); *G06F 16/212* (2019.01); *G06F 16/248* (2019.01); *G07C 5/0808* (2013.01)

(58) Field of Classification Search
CPC ..... G07C 5/008; G07C 5/0808; G06F 16/212; G06F 16/248
USPC ....................................................... 701/31.4
See application file for complete search history.

(56) References Cited

U.S. PATENT DOCUMENTS

| | | | |
|---|---|---|---|
| 5,205,261 A | 4/1993 | Betts, Jr. et al. | |
| 6,172,602 B1 | 1/2001 | Hasfjord | |
| 10,546,435 B2 | 1/2020 | Carpenter et al. | |
| 2006/0100796 A1 | 5/2006 | Fraden et al. | |
| 2013/0338855 A1 | 12/2013 | Mason et al. | |
| 2017/0011561 A1 | 1/2017 | Makke et al. | |
| 2017/0159961 A1 | 6/2017 | Kah, III | |
| 2019/0197794 A1 | 6/2019 | Carpenter et al. | |
| 2019/0212022 A1 | 7/2019 | Aeberhard et al. | |
| 2019/0212967 A1* | 7/2019 | Stanley | B60Q 1/268 |
| 2019/0309973 A1 | 10/2019 | Zhang | |
| 2019/0383705 A1 | 12/2019 | Smart et al. | |
| 2020/0030732 A1 | 1/2020 | Wystup et al. | |

FOREIGN PATENT DOCUMENTS

| | | |
|---|---|---|
| CN | 101601951 A | 12/2009 |
| CN | 103405975 A | 11/2013 |
| CN | 203616043 U | 5/2014 |
| CN | 106468230 A | 3/2017 |
| CN | 108506125 A | 9/2018 |
| WO | 02/17184 A1 | 2/2002 |

\* cited by examiner

Primary Examiner — Gertrude Arthur Jeanglaude
(74) Attorney, Agent, or Firm — Perspectives Law Group, Corp.

(57) ABSTRACT

A computing system includes: a control unit is configured to: communicate with a vehicle telematics monitoring system including a statistical database, request an efficiency data, from the vehicle telematics monitoring system, calculate a threshold for the efficiency data, process diagnostic information for a flow, an intake air pressure, an intake air temperature, rotations per minute (RPM), or a combination thereof, calculate an efficiency model based on the diagnostic information; and a communication unit, coupled to the control unit, configured to: communicate a message, when the efficiency model is less than or equal to the threshold, indicating an air filter should be replaced and the message is for displaying on a device.

20 Claims, 5 Drawing Sheets

COMPUTING SYSTEM WITH VEHICLE MAINTENANCE MECHANISM AND METHOD OF OPERATION THEREOF

TECHNICAL FIELD

An embodiment of the present invention relates generally to a computing system, and more particularly to a system for vehicle maintenance mechanism.

BACKGROUND

Modern consumer and industrial electronics, especially vehicle-based telematics monitoring and reporting units and systems, are providing increasing levels of functionality and connectivity to support modern life. For example, the vehicle-based telematics monitoring and reporting units and systems can provide maintenance reminders for the operator of the vehicle. These reminders are based on mileage since the last maintenance event was acknowledged or on a time basis since the last maintenance.

There are many technological solutions to take advantage of this new device or system capability. However, users are often not provided with the ability to access or utilize the telecommunication capability of vehicle-based telematics unit. By strictly performing maintenance on a time or mileage basis, parts can be changed before they actually need to be replaced or in adverse conditions the parts might require replacement prior to the scheduled date or mileage milestone. Failure to replace key parts of an automotive system when they actually require replacement can reduce efficiency or induce physical damage to the mechanics.

Thus, a need still remains for a computing system with a vehicle maintenance mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF INVENTION

An embodiment of the present invention provides a computing system, including a control unit is configured to: communicate with a vehicle telematics monitoring system including a statistical database, request an efficiency data, from the vehicle telematics monitoring system, calculate a threshold for the efficiency data, process diagnostic information for a flow, an intake air pressure, an intake air temperature, rotations per minute (RPM), or a combination thereof, calculate an efficiency model based on the diagnostic information; and a communication unit, coupled to the control unit, configured to: communicate a message, when the efficiency model is less than or equal to the threshold, indicating an air filter should be replaced and the message is for displaying on a device.

An embodiment of the present invention provides a method of operation of a computing system including: communicating with a vehicle telematics monitoring system including a statistical database; requesting an efficiency data, from the vehicle telematics monitoring system; calculating a threshold for the efficiency data; processing diagnostic information for a flow, an intake air pressure, an intake air temperature, a rotations per minute (RPM), or a combination thereof; calculating an efficiency model based on the diagnostic information; and communicating a message, when the efficiency model is less than or equal to the threshold, indicating an air filter should be replaced and the message is for displaying on a device.

An embodiment of the present invention provides a non-transitory computer readable medium including instructions executable by a control circuit for a computing system, the instructions including: communicating with a vehicle telematics monitoring system including a statistical database; requesting an efficiency data, from the vehicle telematics monitoring system; calculating a threshold for the efficiency data; processing diagnostic information for a flow, an intake air pressure, an intake air temperature, a rotations per minute (RPM), or a combination thereof; calculating an efficiency model based on the diagnostic information; and communicating a message, when the efficiency model is less than or equal to the threshold, indicating an air filter should be replaced and the message is for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part.

The term "module" referred to herein can include specialized hardware supported by software in an embodiment of the present invention in accordance with the context in which the term is used. For example, the software can be machine code, firmware, embedded code, and application software. Also for example, the specialized hardware can be circuitry, a processor, a computer, an integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims. The term "match" referred to herein can be described as elements that match have common characteristics or shared identical elements.

The modules in the following description of the embodiments can be coupled to one another as described or as shown. The coupling can be direct or indirect without or with, respectively, intervening items between coupled items. The coupling can be physical contact or by communication between items, such as through non-physical or wireless connection.

Figure 1:
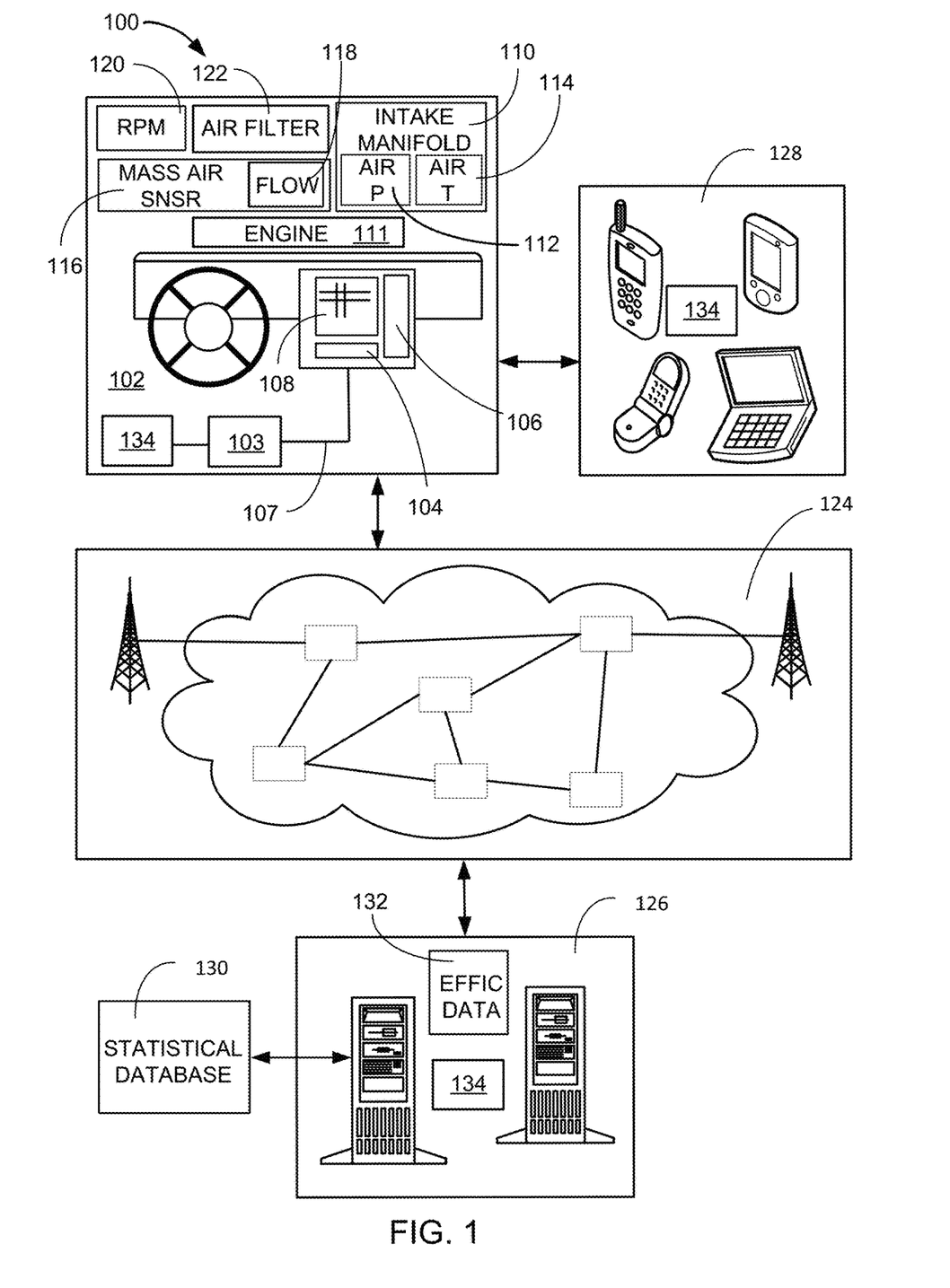
FIG. 1 is a computing system with vehicle maintenance mechanism in an embodiment of the present invention.

Referring now to FIG. 1, therein is shown a computing system 100 with vehicle maintenance mechanism in an embodiment of the present invention. The computing system 100 includes a first device 102, such as a vehicle, truck, boat, automobile, or motorcycle, connected to a second device 126, such as a client or server, a mobile device 128, such as a client device, a vehicle telematics monitoring system or a combination thereof. The first device 102 can communicate with the second device 126 through the communication path 124, such as a wireless or wired network.

The first device 102 can include a monitoring adaptor 103 coupled to a first control unit 104. The monitoring adaptor 103 can be a cellular or WiFi based communication port for receiving and sending information through the communication path 124. The monitoring adaptor 103 can be a hardware structure capable of comparing actual data to the thresholds, provided by the first control unit 104 or the second device 126, and communicating with the first control unit 104, the communication path 124, the mobile device 128, the second device 126, or a combination thereof. The monitoring adaptor 103 can include memory, a processor, interface transceiver and software to support the execution of the processor.

The first control unit 104 can be a computer structure that resides within and controls functions of the first device 102, including performance adjustments, displaying system warnings to a user, logging the status changes, and driving conditions within the first device 102. The first control unit 104 can be coupled to a diagnostic port 106 and a display device 108. The diagnostic port 106 can be a hardware interface including an on-board diagnostic II (OBD2) or other monitoring system for the first control unit 104. The diagnostic port 106 can receive diagnostic information 107 about the operational state of the first device 102 from the first control unit 104. The first control unit 104 can optionally transfer the diagnostic information 107 directly to the monitoring adaptor 103 for processing or to both the diagnostic port 106 and the monitoring adaptor 103.

The display device 108 can include a monitor, a liquid crystal display, an in-vehicle navigation screen, a cell phone display, or the like used by the first control unit 104, for example, to show video content of a back-up camera, alert the user of the first device 102 of any changes in status that can affect the operation of the first device, for providing navigation services, or a combination thereof. The first device 102 can include an intake manifold 110. The intake manifold 110 can be a hardware structure that conveys fuel into an engine 111 of the first device 102. The first control unit 104 can monitor the function of the intake manifold 110 by monitoring an intake air pressure 112, an intake air temperature 114, or the combination thereof.

The engine 111 can be a gasoline or diesel engine capable of powering the first device 102 along a route. The intake air pressure 112 can be a reading from an air pressure sensor that indicates the amount of air pressure resident in the intake manifold 110. The intake air pressure 112 can be transmitted to the first control unit 104. The intake air temperature 114 can be read from a hardware thermocouple used to determine the temperature of the air and gas mixture that is present in the intake manifold 110. The intake air temperature 114 can be transmitted to the first control unit 104.

A mass air flow sensor 116 can be mounted between the intake manifold 110 and an air filter 122. The mass air flow sensor 116 is configured to measure a mass air flow rate 118 including a measure of the rate of transfer of air through the mass air flow sensor 116 and into the intake manifold 110. The mass air flow sensor 116 can be communicatively linked to the first control unit 104, so that the first control unit 104 can control an amount of gas that is mixed with air entering the intake manifold 110.

A rotation per minute (RPM) 120 can be an indication of the rotation rate of the engine 111. The RPM 120 can be read from a tachometer that can be a hardware device configured to monitor and feedback the rotation rate of the engine 111 in the first device 102. The tachometer can be read by the first control unit 104 for display on the display device 108. The first control unit 104 can also utilize the rotations per minute (RPM) 120 read from the tachometer for determining the appropriate controls to apply to the engine 111 of the first device 102. In order for the first control unit 104 to properly manage the efficiency of the engine 111, proper volume of air must be available for the intake manifold 110. As the first device 102 is driven, the air filter 122 can collect dirt and debris that is blocked from entering the intake manifold 110. As the amount of dirt and debris increases, the efficiency of the air filter 122 is reduced and the first control unit 104 will be unable to maintain the efficient operation of the first device 102.

By way of an example, the first control unit 104 can monitor a mileage since the air filter 122 was changed. While the ECM's monitoring of the mileage does provide an alert to the user of the first device 102, the alert has little to do with the ability of the air filter 122 to remove particles and dust from the mass air flow rate 118. In some applications the air filter 122 might be clogged before the mileage alert. In other instances, the air filter 122 might still have operational life when the mileage alert is communicated through the first control unit 104 to the user of the first device 102. In order to prevent driving the first device 102 with a clogged instance of the air filter 122, or removing pre-maturely the air filter that is not clogged, the first control unit 104 can request the second device 126 to analyze a statistical database 130 in order to provide efficiency data 132 of the same model of the air filter 122 installed in the same model vehicle as the first device 102.

The monitoring adaptor 103 can receive the efficiency data 132, requested by the first control unit 104, in order to calculate an efficiency model 134 including receiving thresholds to evaluate the operation of the air filter 122 in the first device 102. By building the efficiency model 134, the monitoring adaptor 103 can actively evaluate the operation of the air filter 122. in order to detect when the air filter 122 reduced efficiency below a threshold required to filter the air flow, which is more closely related to the type of environment the first device 102 is operated in rather than the number of miles driven. As an example, a dusty environment can quickly clog the air filter 122, while in a less dusty environment, the air filter 122 might provide two or more times the useable life span. It is understood that the efficiency model 134 can be stored in the first device 102, the second device 126, the mobile device 128, or a combination thereof. Upon initialization, the efficiency model can be downloaded to the monitoring adaptor 103 by the first control unit 104.

In order to provide the efficiency data 132 to the first control unit 104, the second device 126 can access the statistical database 130, including efficiency profiles for vehicles that are the same year, model, equipment, size of the engine 111, mileage, or a combination thereof. The first control unit 104 can receive the efficiency data 132 and calculate thresholds or receive the thresholds, from the second device 126, for the monitoring adaptor 103 of the first device 102 based on the efficiency data 132. The monitoring adaptor 103 can receive periodic engine data from the first control unit 104, the diagnostic port 106, or a combination thereof. The monitoring adaptor 103 can poll the first control unit 104 or the diagnostic port 106 on an interval, such as 10 second intervals.

The monitoring adaptor 103, the first control unit 104, or the combination thereof can calculate the efficiency model 134 for the air filter 122 of the first device 102, based on the periodic engine data. The condition of the air filter 122 can be determined by comparing the efficiency model 134 to the thresholds calculated by the second device 126 from the efficiency data 132. The monitoring adaptor 103 can monitor several thresholds that can alert the user of the first device 102 to the condition of the air filter 122. By way of an example, the monitoring adaptor 103, the first control unit 104, or the combination thereof can set the thresholds to suggest the air filter 122 could be changed at 30% efficiency and a check-engine light might be set when the 20% efficiency is detected.

The monitoring adaptor 103, the first control unit 104, or the combination thereof can calculate the efficiency model 134 by:

$$\eta_V = \frac{2\dot{m}_a(\text{kg/sec})}{P_a(\text{kg/m}^3)V_d(\text{m}^3)N(1/\text{sec})} \quad \text{Equation (1)}$$

Where m is the mass air flow rate 118, ρ is air density, V is displacement volume of the cylinder, and N is the RPM of the engine 111. If intake air pressure pa [Pa] and temperature Ta [K] are measured in the intake manifold, the intake air density ρ can be calculated as:

$$p\alpha = p\alpha/(R\alpha \cdot T\alpha) \quad \text{Equation (2)}$$

where:
ρa [kg/m3]—represents the intake air density
pa [Pa]—intake air pressure as indicated by the intake air pressure 112.
Ta [K]—intake air temperature as indicated by the intake air temperature 114.
Ra [J/kgK]—gas constant for dry air (equal to 286.9 J/kgK)

By way of an example, the first device 102 can be a vehicle as a separate stand-alone. The first device 102 can couple, either directly or indirectly, to the communication path 124 to communicate with the second device 126. Additional details of the first device 102 will be discussed below.

The mobile device 128 can be any variety of a mobile computing device, such as a cellular phone, a tablet computer, a smart phone, a notebook computer. In some embodiments, the mobile device 128 can connect to the communication path 124 through the first device 102.

The second device 126 can be any of a variety of centralized or decentralized computing devices. For example, the second device 126 can be a multimedia computer, a laptop computer, a desktop computer, grid-computing resources, a virtualized computer resource, cloud computing resource, routers, switches, peer-to-peer distributed computing devices, or a combination thereof.

The second device 126 can be centralized in a single room, distributed across different rooms, distributed across different geographical locations, or embedded within a telecommunications network. The second device 126 can couple with the communication path 124 to communicate with the first device 102.

For illustrative purposes, the computing system 100 is described with the second device 126 as a computing device, although it is understood that the second device 126 can be different types of devices. Also, for illustrative purposes, the computing system 100 is shown with the second device 126 and the first device 102 as end points of the communication path 124, although it is understood that the computing system 100 can have a different partition between the first device 102, the second device 126, and the communication path 124. For example, the first device 102, the second device 126, or a combination thereof can also function as part of the communication path 124. As an example, if the monitoring adaptor 103 detects that it is time to change the air filter 122, a message can be sent to the mobile device 128 to alert the user of the mobile device 128 to the condition of the air filter 122. It is understood that the first control unit 104 can also present a message on the display device 108 to alert the user of the first device 102.

The communication path 124 can span and represent a variety of networks and network topologies. For example, the communication path 124 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 124. Ethernet, digital subscriber line (DSL), fiber to the home (FTTH), and plain old telephone service (POTS) are examples of wired communication that can be included in the communication path 124. Further, the communication path 124 can traverse a number of network topologies and distances. For example, the communication path 124 can include direct connection, personal area network (PAN), local area network (LAN), metropolitan area network (MAN), wide area network (WAN), or a combination thereof.

It has been discovered that the user of the first device 102 can be alerted to the condition of the air filter 122 by the monitoring adaptor 103 comparing the efficiency calculated for the first device 102 with the efficiency data 132 collected from the statistical database 130 containing the efficiency information for the population, of vehicles in the same category as the first device 102. The category includes the same make, model, year, and the engine 111 as the first device 102. The information for the population of vehicles in the same category as the first device 102 can be actively collected as the vehicles are driven or the information can come from manufacturer's simulation of the performance of the air filter 122. By changing the air filter 122 when the first control unit 104 displays the alert message on the display 108, indicating the filter 122 has below average efficiency, the user of the first device can save money by only changing the air filter 122 when it is ready to be replaced and it prevents sending useable ones of the air filter 122 to a landfill for disposal.

Figure 2:
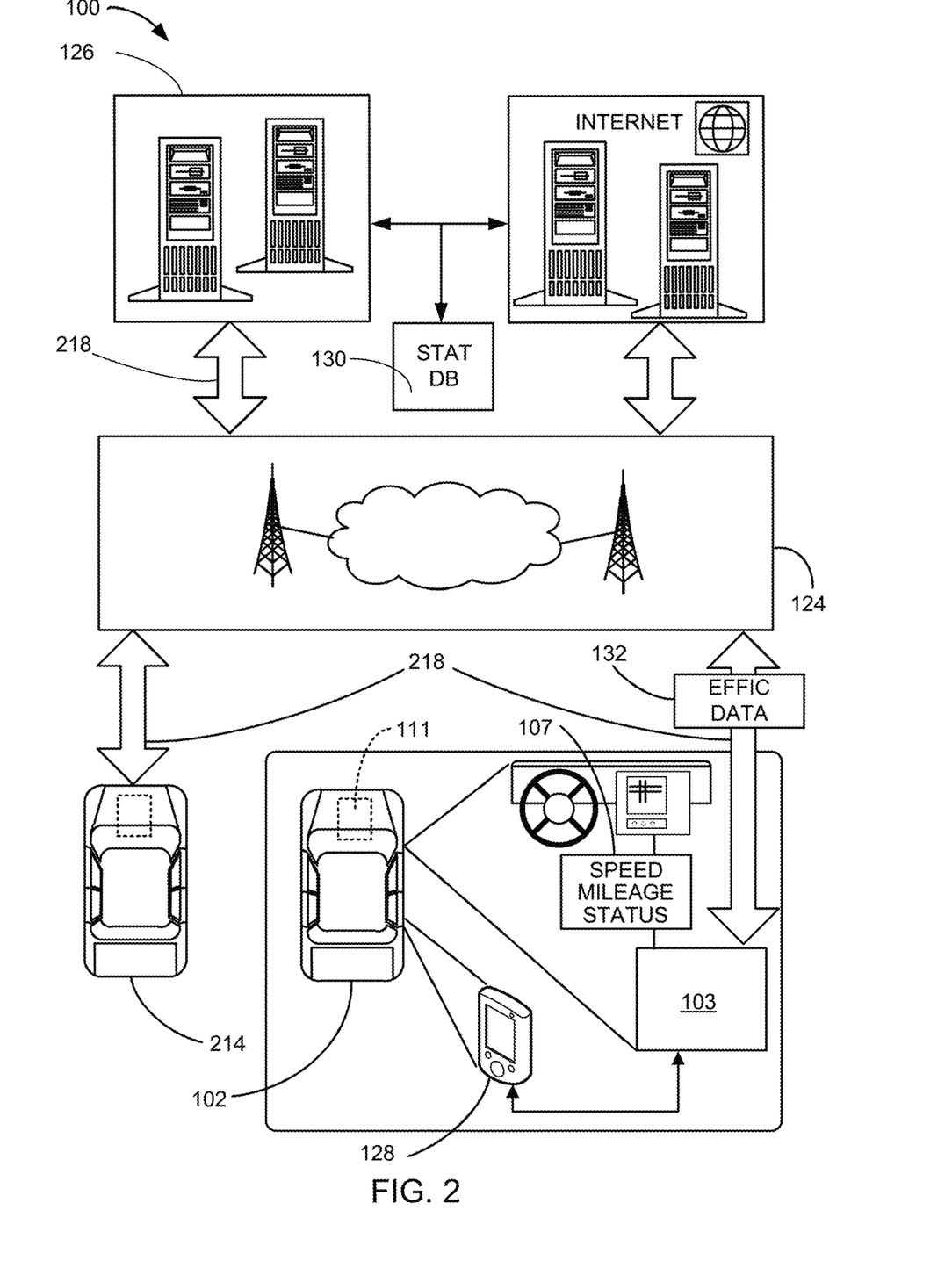
FIG. 2 an example implementation of the computing system in an embodiment of the present invention.

Referring now to FIG. 2, therein is shown an example implementation of the computing system 100 in an embodiment of the present invention. In general, the computing system 100 can include the second device 126 that can function as a vehicle telematics monitoring system 126. The vehicle telematics monitoring system 126 is a system for monitoring telematics information from multiple vehicles. As an example, the vehicle telematics monitoring system 126 can be an information server, such as a web or internet-based portal for receiving and monitoring telematics information about one or more vehicles. As a specific example, the vehicle telematics monitoring system 126 can include or be a part of the second device 126 of FIG. 1.

In general, the vehicle telematics monitoring system 126 can receive, monitor or a combination thereof the diagnostic information 107 related to the efficiency of the air filter 122 of FIG. 1. The diagnostic information 107 is information about the movement and status of multiple telematics monitored vehicles 214. For example, the diagnostic information 107 can include position or location information, the diagnostic information 107, such as information about the status or condition of various mechanical or electrical components or systems of the vehicle; vehicle operation information, such as information about vehicle mileage and how the vehicle is driven or the maneuvers made by the driver of the vehicle; or a combination thereof.

The vehicle telematics monitoring system 126 can monitor the diagnostic information 107, which can include receiving the diagnostic information 107, from the telematics monitored vehicles 214 and the first device 102. The telematics monitored vehicles 214 are vehicles that are associated with the vehicle telematics monitoring system 126. As an example, the telematics monitored vehicles 214 and the first device 102 can be associated with the vehicle telematics monitoring system 126 by being registered with the vehicle telematics monitoring system 126, through a connection to the vehicle telematics monitoring system 126, or a combination thereof. The vehicle telematics monitoring system 126 can compile the statistical database 130 by loading details of the telematics monitored vehicles 214 including manufacturer, model, year, and size of the engine 111, mileage, and maintenance history. The vehicle telematics monitoring system 126 can segregate the statistical database 130 into a specific group that matches the first device 102 in the same manufacturer, model, year, and size of the engine 111. The diagnostic information 107 can include a speed, mileage, status of the engine 111, and the efficiency model 134 of FIG. 1.

In some embodiments, the telematics monitored vehicles 214 and the first device 102 can be connected to the vehicle telematics monitoring system 126 through the monitoring adaptor 103. The monitoring adaptor 103 is a unit for monitoring and transferring vehicle telematics data about the telematics monitored vehicles 214 to the vehicle telematics monitoring system 126. For example, the monitoring adaptor 103 can be a device or hardware unit connected to or integrated with the telematics monitored vehicles 214 and the first device 102 to collect, monitor, record, or a combination thereof the diagnostic information 107 about the telematics monitored vehicles 214 and the first device 102. As another example, the monitoring adaptor 103 can be in the first device 102 of FIG. 1. In one embodiment, the monitoring adaptor 103 can be a standalone unit that is physically or wirelessly connected to the telematics monitored vehicles 214, such as through a Bluetooth connection or the diagnostics port 106 of FIG. 1 of the telematics monitored vehicles 214 or other connection that is capable of providing the diagnostic information 107 about the systems of the telematics monitored vehicles 214. In another embodiment, the monitoring adaptor 103 can be integrated with the telematics monitored vehicles 214 and the first device 102.

In other embodiments, the monitoring adaptor 103 can provide the telematics monitored vehicles 214 and the first device 102 wireless connection to the vehicle telematics monitoring system 126. The wireless connection between the monitoring adaptor 103 and the vehicle telematics monitoring system 126 enables transmission of the diagnostic information 107 for the telematics monitored vehicles 214 and the first device 102. For example, the diagnostic information 107 can be transferred from the monitoring adaptor 103 to the vehicle telematics monitoring system 126 as the efficiency data 132. The efficiency data 132 is data that is for sending and receiving through the monitoring adaptor 103. The efficiency data 132 can provide a current description of the first device 102 including the manufacturer, model, year, size of the engine 111, current status, the efficiency model 134, or a combination thereof.

In general, the efficiency data 132 transferred between the monitoring adaptor 103 and the vehicle telematics monitoring system 126 is transferred over the communication path 124. The vehicle telematics monitoring system 126 can collect the efficiency data 132 from the telematics monitored vehicles 214 and the first device 102 in order to compile the statistical database 130. It is understood that the statistical database 130 can reflect hundreds or thousands of the telematics monitored vehicles 214 that match the first device 102. By collecting the efficiency data 132 from the telematics monitored vehicles 214, the vehicle telematics monitoring system 126 can provide the first device 102 with a statistically significant base with which to compare the efficiency model 134.

By way of an example, the vehicle telematics monitoring system 126 can perform data mining of the statistical database 130 in order to deliver the efficiency model 134 to the first device 102. As the statistical database 130 grows, due to the number of the telematics monitored vehicles 214 being monitored increasing and more of the efficiency data 132 is reported to the vehicle telematics monitoring system 126, big data processing techniques can be applied to sort the statistical database 130.

It has been discovered that the vehicle telematics monitoring system 126 can provide the efficiency data 132 to the first device 102 in order to establish the thresholds for alerting the user of the first device 102 that it is time to change the air filter 122 of FIG. 1. By loading the thresholds, the monitoring adaptor 103 of FIG. 1 can compare the efficiency data 132 with the performance data provided by the first control unit 104, the diagnostic port 106, or a combination thereof can provide current conditions. The monitoring adaptor 103 can compare the calculated amount of the efficiency model 134 with the thresholds in order to alert the user of the first device 102 that the air filter 122 should be changed. It is understood that the first control unit 104 can alert the user of the first device 102 through the display 108, the mobile device 128, or a combination thereof.

As an example, a first threshold can be set to $30^{th}$ percentile of the population of the similar vehicles listed in the statistical database 130. The $30^{th}$ percentile of the population can provide a first alert that the air filter 122 will soon need to be changed. A second threshold set to $20^{th}$ percentile of the population of the similar vehicles listed in the statistical database 130 can indicate the air filter 122 must be changed in order to protect the engine 111. In the event the $20^{th}$ percentile of the population has been met the first control unit 104 can set an alert on the display device 108, send a text to the mobile device 128, or a combination thereof. By actually sampling the efficiency model 134, the user of the first device 102 can make sure the engine 111 is protected without unnecessarily changing the air filter 122 that still has functional life remaining.

Figure 3:
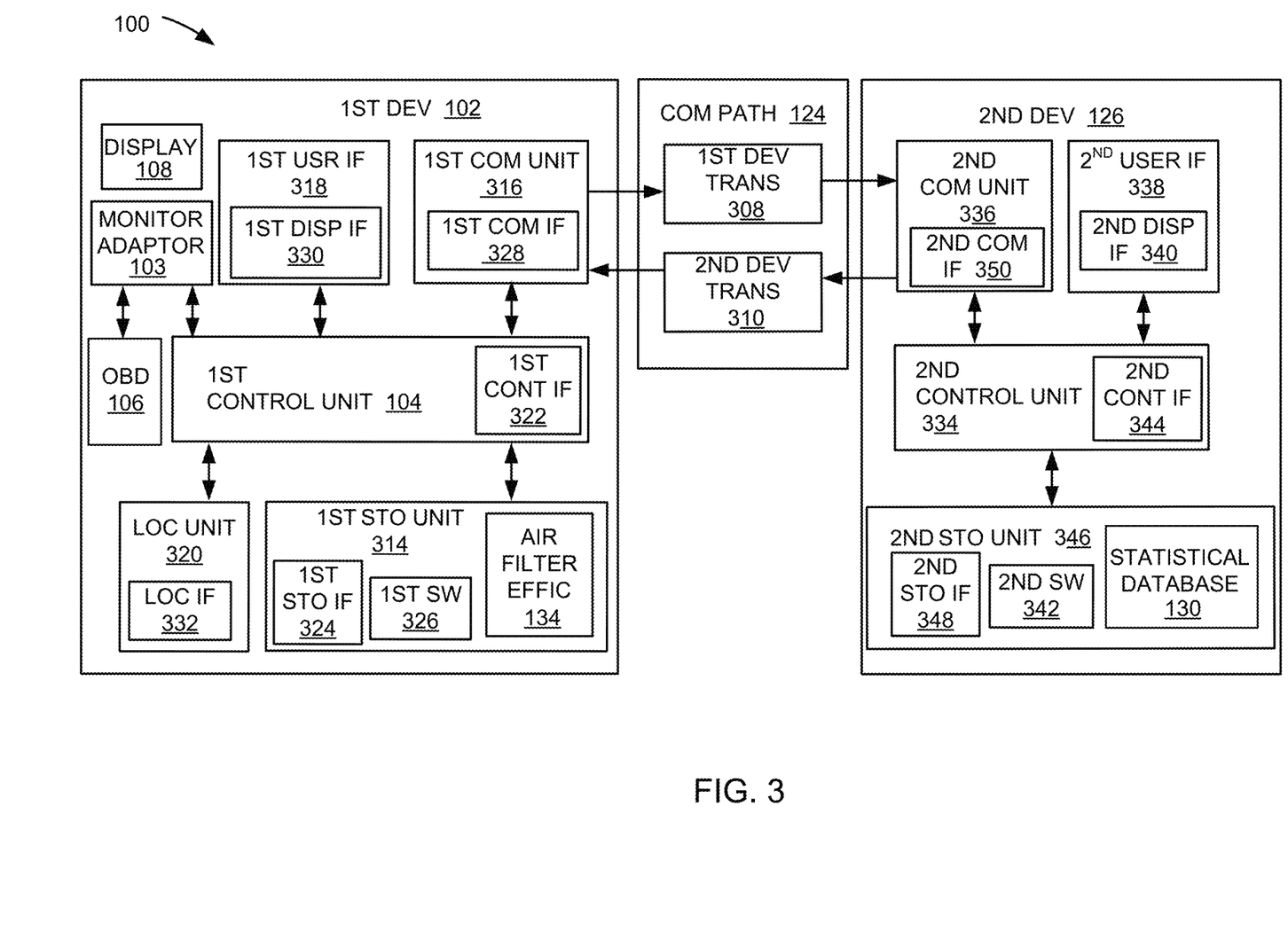
FIG. 3 is an exemplary block diagram of the computing system.

Referring now to FIG. 3, therein is shown an exemplary block diagram of the computing system 100. The computing system 100 can include the first device 102, the communication path 124, and the second device 126. The first device 102 can send information in a first device transmission 308 over the communication path 124 to the second device 126. The second device 126 can send information in a second device transmission 310 over the communication path 124 to the first device 102.

For illustrative purposes, the computing system 100 is shown with the first device 102 as a client device, although it is understood that the computing system 100 can have the first device 102 as a different type of device. For example, the first device 102 can be a server having a display interface 330.

Also, for illustrative purposes, the computing system 100 is shown with the second device 126 as a server, although it is understood that the computing system 100 can have the second device 126 as a different type of device. For example, the second device 126 can be a client device.

For brevity of description in this embodiment of the present invention, the first device 102 will be described as a client device and the second device 126 will be described as a server device. The embodiment of the present invention is not limited to this selection for the type of devices. The selection is an example of an embodiment of the present invention.

The first device 102 can include the monitoring adaptor 103, the first control unit 104, the diagnostic port 106, a first storage unit 314, a first communication unit 316, a first user interface 318, and a location unit 320. The first control unit 104 can include a first control interface 322. The first control unit 104 can execute a first software 326 to provide the intelligence and control of the first device 102 of the computing system 100.

The first control unit 104 can be implemented in a number of different manners. For example, the first control unit 104 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 104 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial computing system, a cellular-tower location system, a pressure location system, or any combination thereof. As a further example, the location unit 320 can include hardware components and functionality for WiFi based positioning, such as identification of position or location by scanning and comparison of relative signal strength for proximately located WiFi signals sources. As another example, the location unit 320 can include the GPS location system capable of determining the altitude of the first device 102. In an example of a naturally aspirated version of the engine 111 of FIG. 1, which may not include an air pressure sensor in the intake manifold, the air pressure in manifold can be estimated by knowing the altitude. Altitude can be derived from the location information provided by the location unit 320.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information. For example, the first storage unit 314 can store information such as the efficiency model 134 received by the vehicle telematics unit 210 of FIG. 2.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 126, the mobile device 128 of FIG. 1, an attachment, such as the telematics monitored vehicles 214 of FIG. 2, a peripheral device, or a computer desktop, and the communication path 124.

The first communication unit 316 can also function as a communication hub allowing the first device 102 to function as part of the communication path 124 and not limited to be an end point or terminal unit to the communication path 124, such as allowing the mobile device 128 of FIG. 1 to access the communication path 124. The first communication unit 316 can include active and passive components, such as microelectronics or an antenna, for interaction with the communication path 124. For example, the first communication unit 316 can include active and passive components to enable the first communication unit 316 to function as a WiFi hotspot, a router, a switch, or a combination thereof.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device, such as the display device 108. Examples of the input device of the first user interface 318 can include a keypad, a touchpad, soft-keys, a keyboard, a microphone, an infrared sensor for receiving remote signals, the monitoring adaptor 103 or any combination thereof to provide data and communication inputs.

The first user interface 318 can include the first display interface 330. The first display interface 330 can, for example, include the display device 108, a projector, a video screen, a speaker, or any combination thereof. The monitoring adaptor 103 can communicate through the first user interface 318. It is understood that the monitoring adaptor 103 can interface directly with the second device 126 through a WiFi link not shown.

The first control unit 104 can operate the first user interface 318 to display information generated by the computing system 100. The first control unit 104 can also execute the first software 326 for the other functions of the computing system 100. The first control unit 104 can further execute the first software 326 for interaction with the communication path 124 via the first communication unit 316.

The second device 126 can be optimized for implementing an embodiment of the present invention in a multiple device embodiment with the first device 102. The second device 126 can provide the additional or higher performance processing power compared to the first device 102. The second device 126 can include a second control unit 334, a second communication unit 336, and a second user interface 338.

The second user interface 338 allows a user (not shown) to interface and interact with the second device 126. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 126 of the computing system 100. The second software 342 can operate in conjunction with the first software 326. The second software 342 can include programs to manipulate the statistical database 130, such as the Big Data programs including, for example, Hadoop and MapReduce. The second control unit 334 can provide additional performance compared to the first control unit 104.

The second control unit 334 can operate the second user interface 338 to display information. The second control unit 334 can also execute the second software 342 for the other functions of the computing system 100, including operating the second communication unit 336 to communicate with the first device 102 over the communication path 124.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 126. The second controller interface 344 can also be used for communication that is external to the second device 126.

The second controller interface 344 can receive information from the other functional units or from external sources, or can transmit information to the other functional units or to external destinations. The external sources and the external destinations refer to sources and destinations external to the second device 126.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342 and the statistical database 130. The second storage unit 346 can also store the information for generating the interface map 218 of FIG. 2. The second storage unit 346 can be sized to provide the additional storage capacity to supplement the first storage unit 314. The statistical database 130 can maintain efficiency data on hundreds or thousands of vehicles substantially similar to the first device 102. The second control unit 334 can manipulate the statistical database 130 in order to provide support for the efficiency model 134 used by the monitoring adaptor 103 to calculate the efficiency model 134.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 126. The second storage interface 348 can also be used for communication that is external to the second device 126.

The second storage interface 348 can receive information from the other functional units or from external sources, or can transmit information to the other functional units or to external destinations. The external sources and the external destinations refer to sources and destinations external to the second device 126.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 126. For example, the second communication unit 336 can permit the second device 126 to communicate with the first device 102 over the communication path 124.

The second communication unit 336 can also function as a communication hub allowing the second device 126 to function as part of the communication path 124 and not limited to be an end point or terminal unit to the communication path 124. The second communication unit 336 can include active and passive components, such as microelectronics or an antenna, for interaction with the communication path 124.

The second communication unit 336 can include a second communication interface 350. The second communication interface 350 can be used for communication between the second communication unit 336 and other functional units in the second device 126. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 124 to send information to the second device 126 in the first device transmission 308. The second device 126 can receive information in the second communication unit 336 from the first device transmission 308 of the communication path 124.

The second communication unit 336 can couple with the communication path 124 to send information to the first device 102 in the second device transmission 310. The first device 102 can receive information in the first communication unit 316 from the second device transmission 310 of the communication path 124. The computing system 100 can be executed by the first control unit 104, the second control unit 334, or a combination thereof. For illustrative purposes, the second device 126 is shown with the partition having the second user interface 338, the second storage unit 346, the second control unit 334, and the second communication unit 336, although it is understood that the second device 126 can have a different partition. For example, the second software 342 can be partitioned differently such that some or all of its function can be in the second control unit 334 and the second communication unit 336. Also, the second device 126 can include other functional units not shown in FIG. 3 for clarity.

The functional units in the first device 102 can work individually and independently of the other functional units. The first device 102 can work individually and independently from the second device 126 and the communication path 124.

The functional units in the second device 126 can work individually and independently of the other functional units. The second device 126 can work individually and independently from the first device 102 and the communication path 124.

For illustrative purposes, the computing system 100 is described by operation of the first device 102 and the second device 126. It is understood that the first device 102 and the second device 126 can operate any of the modules and functions of the computing system 100 described below.

It has been discovered that the computing system 100 can provide flexible manipulation of the statistical database 130, while the second device 124 can manipulate the statistical database 130 and the first device 102 can monitor the efficiency model 134. The split responsibilities of the computing system 100 allows the first device 102 to maintain operational management of the first control unit 104, while the monitoring adaptor 103 calculates the efficiency model 134. The monitoring adaptor 103 can read the required information from the first control unit 104 while the first device is in use. The monitoring of the efficiency model 134 can provide the best estimate for accurately identifying when the air filter 122 of FIG. 1 must be changed to protect the engine 111 of FIG. 1 of the first device 102. The monitoring adaptor 103 can communicate with the first control unit 104 to notify the operator of the first device 102 that the air filter 122 should be changed.

Figure 4:
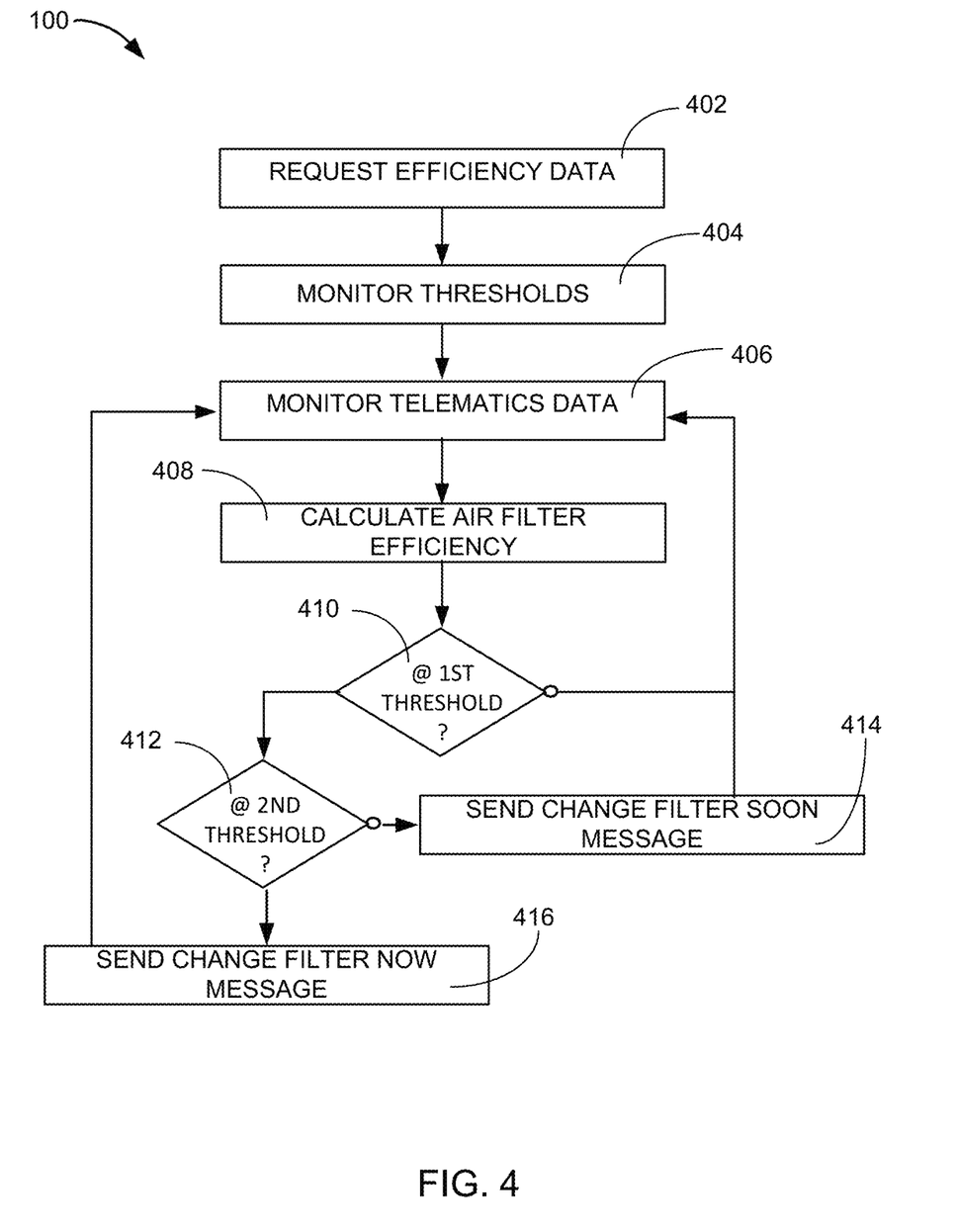
FIG. 4 is a control flow of the computing system of the present invention.

Referring now to FIG. 4, therein is shown a control flow of the computing system 100. In general, the control flow for computing system 100 with the vehicle maintenance mechanism describes an embodiment for monitoring the efficiency model 134 over the communication path 124 of FIG. 1. The control flow enters a request efficiency data 402, in which the first device 102 can request the second device 126 sort the statistical database 130 in order to provide the efficiency data 132 to the first device 102. The second device 126 can sort the statistical database 130 using Big Data techniques and software including, for example, Hadoop and MapReduce in order to sort the efficiency data 132 that matches the first device 102. Once sorted, the second device 126 can transfer the efficiency data 132 that matches the first device 102 to the monitoring adaptor 103 of FIG. 1, through the first control unit 104 of FIG. 1.

The flow proceeds to a load thresholds 404, where the monitoring adaptor 103 of FIG. 1 can select a first threshold at the $30^{th}$ percentile of the population of the efficiency data 132 and a second threshold at $20^{th}$ percentile of the population of the efficiency data 132. The monitoring adaptor 103 can receive the efficiency data 132 from the vehicle telematics monitoring system 126 of FIG. 2 that has been sorted to deliver only the efficiency data for vehicles that match the first device 102. The peak efficiency and the average efficiency, calculated from 100's or 1000's of matching vehicles, can be scaled to identify the first threshold as at $30^{th}$ percentile of the population of the efficiency data 134 in order to alert the user of the first device 102 that the air filter 122 can soon be due for a change. The vehicle telematics monitoring system 126 can calculate the second threshold to be at $20^{th}$ percentile of the population of the efficiency data 134. The second threshold can alert the user that the air filter 122 must be changed as soon as possible. In order to monitor the thresholds, the monitoring adaptor 103 can process the diagnostic information 107 of FIG. 1 for the engine 111 of FIG. 1 through the first control unit 104 or the diagnostic port 106 of FIG. 1.

The flow proceeds to a monitor telematics data 406, in which the monitoring adaptor 103 can receive the diagnostic data 107 including the flow 118 of FIG. 1, the intake air pressure 112, the intake air temperature 114, and the RPM 120 from the first control unit 104 or the diagnostic port 106. The monitoring adaptor 103 can calculate the efficiency model 134 periodically. The monitoring adaptor 103 can read the data form the first control unit 104 approximately 10 seconds intervals in order to perform the calculation.

The flow proceeds to a calculate air filter efficiency 408, in which the monitoring adaptor 103 can perform the calculations to determine the efficiency model 134 of the first device 102. The monitoring adaptor 103 can determine the current value of the efficiency model 134 by utilizing equation 1. The monitoring adaptor 103 can include support circuitry that allows the quick calculation of the efficiency model 134. It is understood that the flow 118, the intake air pressure 112, the intake air temperature 114, and the RPM 120 can vary as the first device 102 is driven and the calculations of the efficiency model 134 indicate the condition of the air filter 122 of FIG. 1 at the time of the sample. Under heavy acceleration with the value of the RPM 120 at a high level, the efficiency model could detect a crossing of the first threshold or the second threshold that might not be detected a lower value of the RPM 120. By sampling the efficiency model 134 on 10 second intervals, the monitoring adaptor 103 can alert the first control unit 104 of the condition. The first control unit 104 can determine when to assert the alert to the user of the first device 102.

The flow proceeds to a check for first threshold 410, in which the monitoring adaptor 103 can perform a compare to determine whether the current value of the efficiency model 134 is at or below the first threshold level. The first threshold can indicate the air filter 122 should be changed soon. This alert sent to the display device 108 and the mobile device 128 in order to make sure the user of the first device 102 is aware of the performance of the air filter 122. The user of the first device 102 can extend the useful life of the air filter 122 by driving less aggressively once the first alert message has been issued.

If the monitoring adaptor 103 detects that the current value of the efficiency model 134 is above the first threshold, the flow proceeds to the monitor telematics data 406 in order to read the next set of the data from the first control unit 104. If in fact the current value of the efficiency model 134 is less than or equal to the first threshold, the flow proceeds to a "check for second threshold" 412. The check for second threshold 412 can determine whether the current value of the efficiency model 134 is above the second threshold. This indicates the efficiency model 134 is between the first threshold and the second threshold. In this state, a savvy user of the first device can reduce the demand on the air filter 122 by reducing the RPM 120 until the air filter can be serviced.

The flow proceeds to a send change filter soon message 414, in which the monitoring adaptor 103 can communicate with the first control unit 104 to display the message on the display device 108 in order to notify the user of the first device 102. The flow would then return to the monitor telematics data 406 in order to read the next set of the data from the first control unit 104. It is understood that the message sent by the send change filter soon message 414 is for the convenience of the user of the first device 102. The user of the first device 102 can be alerted that the performance of the first device can be impaired by the low efficiency of the air filter 122.

If the check for second threshold 412 can determine that the current value of the air filter efficiency is equal to or below the second threshold. Since the air filter 122 is essential for the efficient operation of the first device 102, it is imperative that the send change filter now message 416 is sent to the first control unit 104 for display on the display device 108 and the monitoring adaptor 103 can send the message directly to the mobile device 128 as a text. The notifications will persist until the air filter has been changed. After the message has been sent to the first control unit 104 and the mobile device 128, the flow returns to the monitor telematics data 406 in order to read the next set of the data from the first control unit 104.

It has been discovered that the computing system 100 can actually measure the performance of the air filter 122. The availability of the dynamic data including the flow 118, the intake air pressure 112, the intake air temperature 114, and the RPM 120 can allow the monitoring adaptor 103 to perform the calculation. The monitoring adaptor 103 can calculate the efficiency model 134 periodically. The monitoring adaptor 103 can read the data form the first control unit 104 approximately 10 seconds intervals. It is understood that the vehicle telematics monitoring system 126 can perform the Big Data sorting of the thousands of vehicles entered in the statistical database 130. By comparing only the vehicles that match the first device 102 in the same manufacturer, model, year, and size of the engine 111, the efficiency data 132 directly applies to the first device 102. It is understood that different vehicles will receive the efficiency data 132 compiled form a different set of the vehicles sorted from the statistical database 130. The comparing allows the computing system 100 to detect a range of efficiency values regardless of the type/manufacturer of the air filter 122, and regardless of the environment conditions, to provide an accurate evaluation of the state of the air filter 122.

It has further been discovered that the computing system 100 can prevent unnecessarily changing the air filter 122 based only on mileage or a visual inspection of the air filter 122 as is customary in the auto service industry. By using the latest information to detect the efficiency data 132 and allowing the monitoring adaptor 103 to calculate the efficiency model 134, the user of the first device 102 can be certain that they are not wasting money and no damage to the engine 111 will occur due to a clogged one of the air filter 122.

Figure 5:
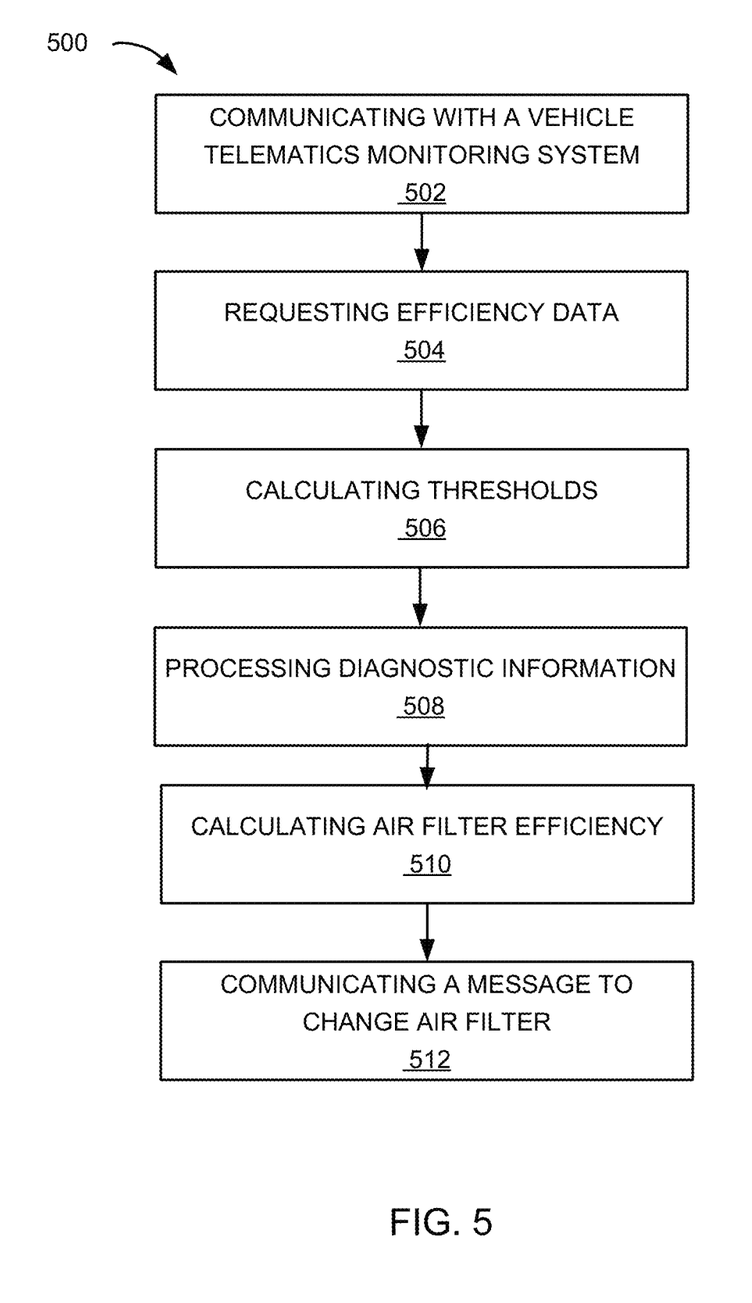
FIG. 5 is a flow chart of a method of operation of a computing system in an embodiment of the present invention.

Referring now to FIG. 5, therein is shown a flow chart of a method 500 of operation of a computing system 100 in an embodiment of the present invention. The method 500 includes: communicating with a vehicle telematics monitoring system including a statistical database in a block 502; requesting an efficiency data, from the vehicle telematics monitoring system in a block 504; calculating a threshold for the efficiency data in a block 506; processing diagnostic information for a flow, an intake air pressure, an intake air temperature, a rotations per minute (RPM), or a combination thereof in a block 508; calculating an efficiency model based on the diagnostic information in a block 510; and communicating a message, when the efficiency model is less than or equal to the threshold, indicating an air filter should be replaced and the message is for displaying on a device in a block 512. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance. These and other valuable aspects of an embodiment of the present invention consequently further the state of the technology to at least the next level. While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
 a control unit is configured to:
  communicate with a statistical database that maintains efficiency data for a population of vehicles based on year, model, and size of engine,
  request the efficiency data includes the efficiency data, from the statistical database, sorted for a specific group that matches a device in model, year, and size of engine,
  calculate a threshold for the efficiency data,
  process diagnostic information for a flow, an intake air pressure, an intake air temperature, rotations per minute (RPM), or a combination thereof,
  calculate an efficiency model based on the diagnostic information; and
 a communication unit, coupled to the control unit, configured to:
  communicate a message, when the efficiency model is less than or equal to the threshold, indicating an air filter should be replaced and the message is for displaying on the device.

2. The system as claimed in claim 1 wherein, the communication unit is further configured to:
 receive the efficiency data; and
 distribute the message to the device and a mobile device when the efficiency model is less than or equal to the calculated threshold.

3. The system as claimed in claim 1 wherein, the control unit is configured to communicate a change air filter soon message to the device when the efficiency model is less than or equal to a first threshold.

4. The system as claimed in claim 1 wherein, the control unit is coupled to a monitoring adaptor configured to process the diagnostic information including the flow, the intake air pressure, the intake air temperature, and the RPM coupled through a diagnostic port.

5. The system as claimed in claim 1 wherein, the communication unit is configured to transfer the efficiency data to a monitoring adaptor to calculate the efficiency model with the threshold to display a change filter soon message or a change filter now message on the device or a mobile device.

6. The system as claimed in claim 1 wherein, the control unit is configured to compile a statistical database by loading manufacturer, model, year, and size of the engine for telematics monitored vehicles.

7. The system as claimed in claim 1 wherein, the control unit is configured to compile thousands of telematics monitored vehicles including receiving the current value of the efficiency model.

8. A method of operation of a computing system comprising:
 communicating with a statistical database that maintains efficiency data for a population of vehicles based on year, model, and size of engine;
 requesting the efficiency data includes sorting the efficiency data, from the statistical database, for a specific group that matches a device in model, year, and size of engine;
 calculating a threshold for the efficiency data;
 processing diagnostic information for a flow, an intake air pressure, an intake air temperature, the rotations per minute (RPM), or a combination thereof;
 calculating an efficiency model based on the diagnostic information; and
 communicating a message, when the efficiency model is less than or equal to the threshold, indicating an air filter should be replaced and the message is for displaying on the device.

9. The method as claimed in claim 8 further comprising:
 receiving the efficiency data; and
 distributing the message to the device and a mobile device when the efficiency model is less than or equal to the calculated threshold.

10. The method as claimed in claim 8 wherein, communicating the message includes communicating a change air filter soon message to the device when the efficiency model is less than or equal to a first threshold.

11. The method as claimed in claim 8 wherein, processing the diagnostic information includes the flow, the intake air pressure, the intake air temperature, and the rotations per minute (RPM) coupled through a diagnostic port.

12. The method as claimed in claim 8 further comprising, transferring the efficiency data for calculating the efficiency model with the threshold to display a change filter soon message or a change filter now message on the device or a mobile device.

13. The method as claimed in claim 8 wherein, compiling the statistical database includes loading manufacturer, model, year, and size of the engine for each of the telematics monitored vehicles.

14. The method as claimed in claim 8 wherein, compiling the statistical database includes compiling thousands of the telematics monitored vehicles including loading the current value of the efficiency model.

15. A non-transitory computer readable medium including instructions executable by a control circuit for a computing system, the instructions comprising:

communicating with a statistical database that maintains efficiency data for a population of vehicles based on year, model, and size of engine;

requesting the efficiency data includes sorting the efficiency data, from the statistical database, for a specific group that matches a device in model, year, and size of engine;

calculating a threshold for the efficiency data;

processing diagnostic information for a flow, an intake air pressure, an intake air temperature, the rotations per minute (RPM), or a combination thereof;

calculating an efficiency model based on the diagnostic information; and communicating a message, when the efficiency model is less than or equal to the threshold, indicating an air filter should be replaced and the message is for displaying on the device.

16. The non-transitory computer readable medium as claimed in claim 15, further comprising:

receiving the efficiency data; and distributing the message to the device and a mobile device when the efficiency model is less than or equal to the calculated threshold.

17. The non-transitory computer readable medium as claimed in claim 15, wherein communicating the message includes communicating a change air filter soon message to the device when the efficiency model is less than or equal to a first threshold.

18. The non-transitory computer readable medium as claimed in claim 15, wherein processing the diagnostic information includes the flow, the intake air pressure, the intake air temperature, and the rotations per minute (RPM) coupled through a diagnostic port.

19. The non-transitory computer readable medium as claimed in claim 15, wherein transferring the efficiency data for calculating the efficiency model with the threshold to display a change filter soon message or a change filter now message on the device or a mobile device.

20. The non-transitory computer readable medium as claimed in claim 15, wherein, compiling the statistical database includes loading manufacturer, model, year, and size of the engine for each of the telematics monitored vehicles.

\* \* \* \* \*